United States Patent
Schacht et al.

(10) Patent No.: US 11,052,935 B2
(45) Date of Patent: Jul. 6, 2021

(54) MOTOR-ADJUSTABLE STEERING COLUMN FOR A MOTOR VEHICLE

(71) Applicants: THYSSENKRUPP PRESTA AG, Eschen (LI); thyssenkrupp AG, Essen (DE)

(72) Inventors: Arne Schacht, Feldkirch (AT); Jean-Pierre Specht, Haag (CH); Sebastian Huber, Göfis (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 61 days.

(21) Appl. No.: 16/480,213

(22) PCT Filed: Jan. 23, 2018

(86) PCT No.: PCT/EP2018/051543
§ 371 (c)(1),
(2) Date: Jul. 23, 2019

(87) PCT Pub. No.: WO2018/141581
PCT Pub. Date: Aug. 9, 2018

(65) Prior Publication Data
US 2019/0367071 A1   Dec. 5, 2019

(30) Foreign Application Priority Data
Feb. 1, 2017   (DE) ..................... 10 2017 201 594.2

(51) Int. Cl.
*B62D 1/181*   (2006.01)
(52) U.S. Cl.
CPC .................... *B62D 1/181* (2013.01)
(58) Field of Classification Search
CPC ......... B62D 1/181; B62D 1/185; B62D 1/184
(Continued)

(56) References Cited

U.S. PATENT DOCUMENTS

| 4,602,520 A | 7/1986 | Nishikawa |
| 5,690,362 A | 11/1997 | Peitsmeier |

(Continued)

FOREIGN PATENT DOCUMENTS

| CN | 202987258 U | 6/2013 |
| CN | 103562047 A | 2/2014 |

(Continued)

OTHER PUBLICATIONS

Specification of the U.S. Appl. No. 62/352,809 of which Rouleau (US 20170361863) claims priority (Year: 2016).*

(Continued)

*Primary Examiner* — James A English
*Assistant Examiner* — Kurtis Nielson
(74) *Attorney, Agent, or Firm* — thyssenkrupp North America, LLC (57) ABSTRACT

A motor-adjustable steering column for a vehicle includes a supporting unit attachable to a vehicle body and by which there is held an adjusting unit in which a steering spindle is mounted so as to be rotatable about a longitudinal axis. An adjustment drive is connected to the supporting unit and to the adjusting unit and is adjustable relative to the supporting unit. The adjustment drive includes a drive unit and a threaded spindle which engages in a spindle nut and which has a threaded spindle axis. The threaded spindle and the spindle nut can be driven to rotate relative to one another about the threaded spindle axis by the drive unit. To prevent slipping or spinning of the spindle drive in a crash situation the adjustment drive includes a blocking device which can be brought into a blocking position for blocking the threaded spindle relative to the spindle nut.

10 Claims, 3 Drawing Sheets

(58) Field of Classification Search
USPC .......................................................... 74/492
See application file for complete search history.

(56) References Cited

U.S. PATENT DOCUMENTS

| | | | | |
|---|---|---|---|---|
| 5,848,557 | A * | 12/1998 | Sugiki | B62D 1/181 |
| | | | | 74/493 |
| 6,079,743 | A | 6/2000 | Grams | |
| 7,025,380 | B2 * | 4/2006 | Arihara | B62D 1/181 |
| | | | | 280/775 |
| 7,410,190 | B2 * | 8/2008 | Sawada | B62D 1/19 |
| | | | | 180/427 |
| 10,189,496 | B2 * | 1/2019 | King | B62D 1/184 |
| 10,421,475 | B2 * | 9/2019 | Derocher | F16H 25/2003 |
| 2009/0308189 | A1 * | 12/2009 | Tomaru | B62D 1/181 |
| | | | | 74/89.42 |
| 2011/0167940 | A1 * | 7/2011 | Shavrnoch | B62D 5/0448 |
| | | | | 74/89.36 |
| 2011/0314954 | A1 | 12/2011 | Matsuno | |
| 2013/0098193 | A1 | 4/2013 | Morinaga | |
| 2013/0233117 | A1 * | 9/2013 | Read | B62D 1/181 |
| | | | | 74/493 |
| 2015/0069745 | A1 | 3/2015 | Iwakawa | |
| 2015/0232117 | A1 | 8/2015 | Stinebring | |
| 2017/0120944 | A1 * | 5/2017 | Kato | B62D 1/181 |
| 2017/0361863 | A1 * | 12/2017 | Rouleau | B62D 1/185 |
| 2018/0134308 | A1 * | 5/2018 | Derocher | B62D 1/183 |

FOREIGN PATENT DOCUMENTS

| | | | | |
|---|---|---|---|---|
| DE | 195 24 196 C | | 11/1996 | |
| DE | 196 41 152 A | | 4/1998 | |
| DE | 10 2011 083 190 A | | 3/2013 | |
| DE | 102012112197 A1 * | | 6/2014 | ............ B62D 1/181 |
| DE | 102015215428 A1 * | | 2/2017 | ........... F16H 57/033 |
| DE | 102018204735 A1 * | | 10/2018 | ............ B62D 1/181 |
| EP | 0834437 A | | 4/1998 | |
| EP | 1736395 A | | 12/2006 | |
| JP | 59230861 A * | | 12/1984 | ............ B62D 1/181 |

OTHER PUBLICATIONS

English Translation of International Search Report issued in PCT/EP2018/051543, dated Apr. 20, 2018.

* cited by examiner

MOTOR-ADJUSTABLE STEERING COLUMN FOR A MOTOR VEHICLE

CROSS REFERENCE TO RELATED APPLICATIONS

This application is a U.S. National Stage Entry of International Patent Application Serial Number PCT/EP2018/051543, filed Jan. 23, 2018, which claims priority to German Patent Application No. DE 10 2017 201 594.2, filed Feb. 1, 2017, the entire contents of both of which are incorporated herein by reference.

FIELD

The present disclosure generally relates to a motor-adjustable steering column for a motor vehicle.

BACKGROUND

Steering columns for motor vehicles comprise a steering shaft having a steering spindle, on the rear (in the direction of travel) driver-facing end of which there is attached a steering wheel for introducing a steering command by the driver. The steering spindle is mounted so as to be rotatable about its longitudinal axis in an adjusting unit which is held by a supporting unit on the vehicle body. By virtue of the fact that the adjusting unit is received in a casing unit (also referred to as guide box or box-section swing arm) connected to the supporting unit, so as to be telescopically displaceable in the direction of the longitudinal axis, it is possible for a length adjustment to occur. A height adjustment can be achieved by virtue of the fact that the adjusting unit or a casing unit receiving the latter is pivotably mounted on the supporting unit. The adjustment of the adjusting unit in the length or height direction allows the setting of ergonomically comfortable steering wheel positions relative to the driver position in the operating position, also referred to as driving or operational control position, in which a manual steering engagement can occur.

It is known in the prior art that, in order to adjust the adjusting unit relative to the supporting unit, there can be provided a motor-operated adjustment drive having a drive unit which comprises an electric actuating motor which is connected, generally via a gear mechanism, to a spindle drive which comprises a threaded spindle screwed into a spindle nut. The drive unit allows the threaded spindle and the spindle nut to be driven to rotate with respect to one another about the threaded spindle axis, with the result that, depending on the direction of rotation, they can be moved translationally toward one another or away from one another. In a first embodiment, the threaded spindle can be driven to rotate about its threaded spindle axis by the drive unit, which is fixedly connected to the adjusting unit or the supporting unit, and engages in the spindle nut which is fixedly attached to the supporting unit or the adjusting unit with respect to rotation about the threaded spindle axis. In the direction of the threaded spindle axis, the threaded spindle is supported on the supporting unit or the adjusting unit, and the spindle nut correspondingly on the adjusting unit or the supporting unit, with the result that a rotational driving movement of the threaded spindle causes a translational adjustment of supporting unit and adjusting unit relative to one another. In a second, alternative embodiment, the threaded spindle is coupled nonrotatably to the supporting unit or the adjusting unit with respect to rotation about its threaded spindle axis, and the spindle nut is rotatably mounted in a corresponding manner on the adjusting unit or the supporting unit, but fixed in the direction of the threaded spindle axis. As in the first embodiment, in the direction of the threaded spindle axis, the threaded spindle is supported on the supporting unit or the adjusting unit, and the spindle nut correspondingly on the adjusting unit or supporting unit, with the result that the threaded spindle can be displaced translationally by the drive unit in the direction of the threaded spindle axis by virtue of the spindle nut being driven to rotate by the drive unit. In both embodiments, the spindle drive forms a motor-operated adjustment drive which is active between supporting unit and adjusting unit and by means of which the adjusting unit can be adjusted for adjustment relative to the supporting unit.

In order to realize a length adjustment of the adjusting unit in the direction of the longitudinal axis of the steering spindle, a spindle drive of an adjustment drive can be arranged between the adjusting unit and a casing unit (also referred to as guide box or box-section swing arm) which receives the latter in an axially longitudinally displaceable manner and which is connected to the supporting unit, and wherein the threaded spindle axis can be oriented substantially parallel to the longitudinal axis. For height adjustment, a spindle drive can be arranged between the supporting unit and an adjusting unit, which is mounted thereon in a height-pivotable manner, or casing unit in which the adjusting unit is received. A motor-operated longitudinal and height adjuster can be formed individually or in combination on a steering column.

In a crash situation, a large force is exerted on the adjusting unit by a body striking the steering wheel, this force acting in each case on the spindle drive of the adjusting device in the direction of the threaded spindle axis, in particular on the spindle drive of the longitudinal adjuster that has to take up the force peak exerted by the adjusting unit on the supporting unit in the longitudinal direction. The force acting here in the direction of the threaded spindle axis can cause the threaded spindle to slip in the direction of the threaded spindle axis through the spindle nut, which is thus set in rotation. This can result in an uncontrolled relative movement of adjusting unit and supporting unit. In this respect, energy absorption devices which can be arranged between adjusting unit and supporting unit for the controlled dissipation of the kinetic energy in a crash situation can also be adversely affected in terms of their effectiveness.

It is known in the prior art from DE 195 24 196 C1 to attach an energy absorption element to the spindle drive, whereby energy is intended to be taken up during a relative movement of threaded spindle and spindle nut in a crash situation. However, a prerequisite for the energy conversion sought here is that the spindle drive is yielding and the threaded spindle and spindle nut must thus also be movable relative to one another—even though damped—in a crash situation. Apart from the fact that the required controlled braking of the spindle drive can be realized only with great effort, the aforementioned problem of slipping remains.

Thus, a need exists for an improved steering column in which slipping or spinning of the spindle drive in a crash situation is prevented as far as possible.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a motor-adjustable steering column for a motor vehicle, having a supporting unit which can be attached to a vehicle body and by which there is held an adjusting unit in which a steering spindle is mounted so as to be rotatable about a longitudinal axis, and having an adjustment drive which is connected to the supporting unit and to the adjusting unit and by which the adjusting unit is adjustable relative to the supporting unit, wherein the adjustment drive comprises a drive unit and a threaded spindle which engages in a spindle nut and which has a threaded spindle axis, wherein the threaded spindle and the spindle nut can be driven to rotate relative to one another about the threaded spindle axis by means of the drive unit.

According to the invention, it is proposed for a steering column of the type in question having the features stated at the outset that the adjustment drive has a blocking device which can be brought into a blocking position for blocking the threaded spindle relative to the spindle nut.

The blocking device according to the invention can assume a release or freeing position and a blocking or immobilizing position. In the normal operating state, it is situated in the release position, wherein the threaded spindle and the spindle nut are rotatable relative to one another and an unimpeded adjustment of the spindle drive by the drive unit can occur. In a crash situation, the blocking device is activated and brought into the blocking position, with the result that the adjustment drive is fixed in the set adjustment position such that it then produces a rigid connection between the elements of the steering column which can be adjusted relative to one another in a normal operation, namely the adjusting unit and the supporting unit and/or the casing unit. This is achieved in that, in the engagement position, the blocking device fixes the threaded spindle and the spindle nut relative to one another such that, even under high force peaks in a crash situation, the spindle drive cannot yield, thus does not slip, in the adjustment direction, but forms a rigid force transmission element. It can thereby particularly be ensured that, in a crash situation, the force introduced into the adjusting unit is, as desired, channeled substantially completely into energy absorption devices arranged between adjusting unit and supporting unit, with the result that an optimal, controlled energy absorption is made possible.

The configuration according to the invention is particularly advantageous in such embodiments of steering columns in which an energy absorption device is arranged between the adjusting unit and the supporting unit. Such energy absorption devices are known in different embodiments, and have at least one energy absorption element which is fastened, on the one hand, to a body-mounted component of the supporting device, or a casing unit held thereon, and, on the other hand, to a component, for example the adjusting unit or the like, which can be displaced together with the steering wheel relative to the body in a crash situation. The energy absorption element comprises at least one deformation element which is inserted in the force flow between components moving with respect to one another only in a crash situation, and the energy introduced in a crash situation is converted over the displacement path of the relative movement into a defined plastic deformation of the deformation element, with the result that a controlled braking which is evened out over the displacement path occurs. A deformation element can be designed, for example, as a bending lug which is continuously bent round over a displacement path of the adjusting unit relative to the supporting unit, or as a tear lug which is separated by the relative movement in a crash situation, or as a combined bending-tear lug. It is also known, for energy absorption, to plastically widen an oblong hole over its length by a sliding block or pin moving along therein in a crash situation, to chip a crash element by means of a moving chisel, or in some other way to convert kinetic energy into plastic deformation of a deformation element (deformation work).

It is possible that an energy absorption device is arranged in the force flow between adjustment drive and supporting unit or between adjustment drive and adjusting unit. Here, at least one energy absorption element is mounted, with respect to the force transmission in a crash situation, in series with the spindle drive between the supporting unit and the adjusting unit moving relative thereto, for example in the direction of the longitudinal axis between a casing unit and the adjusting unit received telescopically therein in the longitudinal direction. By virtue of the blocking device brought into engagement in a crash situation, the adjustment device is blocked or immobilized and rigidly fixed in its instantaneous adjustment position, with the result that the force introduced into the adjusting unit is introduced substantially completely into the energy absorption element via the immobilized spindle drive. It is thereby ensured that, unlike in the prior art, the displacement path available for the energy absorption is not shortened by slipping of the spindle drive, but is maintained in full length for the controlled energy conversion in the energy absorption element, with the result that the safety level is increased.

It is advantageous that, in the blocking position, the blocking device blocks a rotation of the threaded spindle relative to the spindle nut. The fixing of the relative rotation of threaded spindle and spindle nut brings about a fixing of the set longitudinal position of the spindle drive. It is advantageous here that, by virtue of the force transmission of the spindle drive, a fixing of the spindle nut with a relatively small holding force is already sufficient to block a change in length of the spindle drive even under a high action of force in a crash situation. For example, in one embodiment, the spindle nut which can be rotatably driven in normal adjustment operation can be held fixedly in a crash situation with respect to its rotation about the threaded spindle axis by engagement of the blocking device, with the result that the spindle drive is blocked. The fixing can be achieved in a simple manner by immobilizing the spindle nut on the supporting unit or a casing unit supported thereby. In alternative embodiments, it is possible that the rotation of the headed spindle is blocked by the blocking device relative to the supporting unit or casing unit.

The blocking device can comprise blocking elements which can be brought into engagement with one another in the blocking position. In normal operation, the blocking elements are situated out of engagement in the release position, and can move freely relative to one another. In a crash situation, corresponding blocking elements are brought into engagement with one another, with the result that the components on which the blocking elements are mounted, for example on supporting, casing and/or adjusting unit, are fixed relative to one another and thus blocked.

Blocking elements according to the invention can be arranged on the spindle nut and/or the supporting unit and/or the threaded spindle and/or the adjusting unit. Here, they are preferably fastened in pairs on the components to be fixed to one another according to the invention in the blocking position, for example on the spindle nut and the supporting unit or a casing unit held thereon, in order to fix the spindle nut with respect to a rotation about the threaded spindle axis relative to the supporting unit. Alternative arrangements of the blocking elements are also possible which engage in one another in a crash situation and then prevent a relative rotation of components of the spindle drive.

There can be provision that the blocking elements are designed as form-fitting elements and/or force-fitting elements. Form-fitting elements can comprise, for example, mutually corresponding toothings, latching-in elements or the like which are brought into engagement with one another in a crash situation to form a form-fitting connection. Alternatively or in combination, force-fitting elements can be formed which are brought frictionally into contact with one another in a crash situation in order to produce a fixed connection with respect to the forces occurring and to bring about blocking. For a reliable holding and blocking action, the force-fitting elements can be configured in a friction-increasing manner, for example by means of suitable roughnesses and/or material pairings.

One advantageous embodiment of the invention can be achieved in that, to produce the blocking position, the blocking elements can be brought into engagement with one another axially in the direction of the threaded spindle axis. In a crash situation, high forces act in the direction of the threaded spindle axis on the spindle drive, which forces can be used to bring blocking elements on movable or rotatable elements of the spindle drive into form-fitting and/or force-fitting engagement with corresponding blocking elements fixed relative thereto in order, according to the invention, to produce a fixed connection. It is thereby possible that, in a crash situation, the blocking device is automatically activated by the forces then acting in the axial direction.

It can furthermore be advantageous that the blocking device has a securing element. This is directed toward the blocking position, meaning that, in the normal operation of the steering column, the blocking device is held by the securing element in the release position, and no unintended activation of the blocking device can occur by the forces occurring in normal operation. It is exclusively when the high forces acting in a crash situation exceed a predetermined threshold value, preferably greater than 1 kN, that the securing element can be overcome in order to bring the blocking device into engagement in the blocking position. A securing element can comprise, for example, an elastic spring element which, under the forces acting in normal operation on the spindle drive, holds mutually corresponding blocking elements, for example form-fitting and/or force-fitting elements, out of engagement at a distance apart from one another as a result of the spring force. It is exclusively as a result of the high forces occurring in a crash situation that the spring element is compressed to such an extent that the blocking elements come into engagement with one another and the blocking device is activated. Alternatively or additionally, the securing element can have a predetermined breaking element which is destroyed in a crash situation and allows the engagement of the blocking device.

One advantageous embodiment can be realized in that the spindle nut is rotatably mounted in a bearing housing connected to the supporting unit, where the spindle nut and the bearing housing comprise corresponding blocking elements which can be brought into engagement with one another. The spindle nut can preferably be mounted in the bearing housing so as to be axially displaceable in the direction of the threaded spindle axis. In this embodiment, the spindle nut can be driven to rotate by the drive unit of the adjustment device for adjustment, for example by virtue of the fact that the spindle nut is designed as a worm wheel which is engagement with a worm which can be driven to rotate by the drive unit. The spindle nut and the bearing housing comprise corresponding blocking elements which can be brought into engagement with one another in the axial direction, that is to say the direction of the threaded spindle axis, with the result that the spindle nut is fixed on the supporting unit with respect to a rotation about the threaded spindle axis, and is thus blocked with respect to a rotation relative to the threaded spindle. This blocking position can be activated by virtue of the fact that the spindle nut is axially displaced in the bearing housing under the action of a force which, in a crash situation, is exerted via the threaded spindle into the spindle nut. Between the spindle nut and the bearing housing there can be arranged a securing element which is active in the axial direction, for example a spring element, which holds the blocking elements counter to their axial engagement direction in the release position. It is only when, in a crash situation, the force exerted in the axial direction on the spindle drive exceeds a predetermined limit value that the blocking elements are brought into engagement with one another counter to the spring force. Alternatively or additionally, the securing element can comprise a predetermined breaking element which breaks in a crash situation and releases the mutual engagement of the blocking elements in the axial direction of the threaded spindle axis.

The adjusting unit can preferably be received in a casing unit so as to be telescopically adjustable in the direction of the longitudinal axis, wherein the adjustment drive is arranged between adjusting and casing units. A telescopic longitudinal adjustment is thus made available, wherein a threaded drive arranged between adjusting unit and casing unit (guide box, box-section swing arm) is configured according to the invention with a blocking device.

Figure 1:
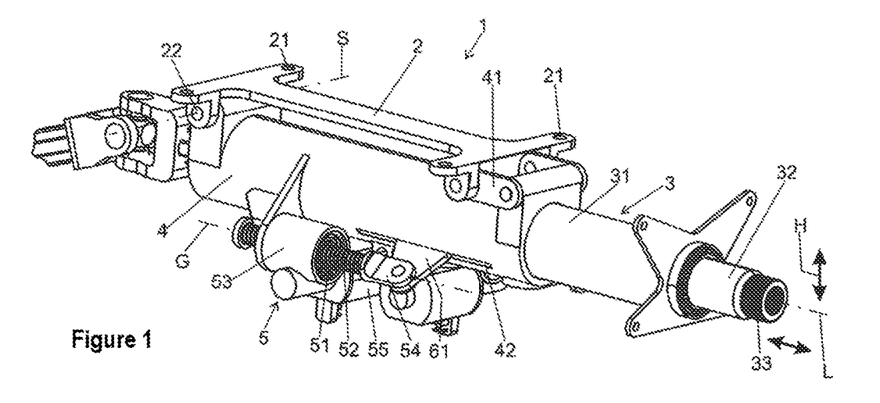
FIG. 1 is a schematic perspective view of a steering column.

FIG. 1 shows a steering column 1 according to the invention in a schematic perspective view laterally obliquely from above of the rear end, with respect to the direction of travel of a vehicle (not shown), where a steering wheel (not shown here) is held in the operating region.

The steering column 1 comprises a supporting unit 2 which takes the form of a bracket which comprises fastening means 21 in the form of fastening holes, for attachment to a vehicle body (not shown). An adjusting unit 3 is held by the supporting unit 2 and is received in a casing unit 4, also referred to as a guide box or box-section swing arm.

The adjusting unit 3 comprises a casing tube 31 in which a steering spindle 32 which extends axially in the longitudinal direction is mounted so as to be rotatable about a longitudinal axis L. At the rear end in on the steering spindle 32 there is formed a fastening portion 33 to which a steering wheel (not shown) can be attached.

To realize a length adjustment, the adjusting unit 3 can be received in the casing unit 4 so as to be telescopically displaceable in the direction of the longitudinal axis L in order that the steering wheel connected to the steering spindle 32 can be positioned back and forth in the longitudinal direction relative to the supporting unit 2, as indicated by the double arrow parallel to the longitudinal axis L.

The casing unit 4 is mounted on the supporting unit 2 in a pivot bearing 22 so as to be pivotable about a horizontal pivot axis S situated transversely with respect to the longitudinal axis L. In the rear region, the casing unit 4 is connected via an adjusting lever 41 to the casing unit 4. A rotary movement of the adjusting lever 41 by means of an actuator (not shown here) allows the casing unit 4 to be pivoted about the pivot axis S, with the result that an adjustment of a steering wheel attached to the fastening portion 33 can be performed in the height direction H, which is indicated by the double arrow.

An adjustment drive 5 comprises a spindle drive with a spindle nut 51 in which a threaded spindle 52 extending along its threaded spindle axis G engages, that is to say is screwed by its external thread into the corresponding internal thread of the spindle nut 51. The threaded spindle axis G extends substantially parallel to the longitudinal axis L.

The spindle nut 51 is mounted in a bearing housing 53 so as to be rotatable about the threaded spindle axis G, which bearing housing 53 is fixedly connected to the casing unit 4. The spindle nut 51 is supported axially on the casing unit 4 via the bearing housing 53 in the direction of the threaded spindle axis G.

The threaded spindle 52 is connected, by way of a fastening element 54 formed on its rear end, to the adjusting unit 3 via an energy absorption device 6, to be precise fixedly in the direction of the threaded spindle axis G or of the longitudinal axis L and fixedly with respect to rotation about the threaded spindle axis G. This can be gathered from the illustration in FIG. 2 in which the casing unit 4 and the bearing housing 53 have been omitted for better clarity.

Figure 2:
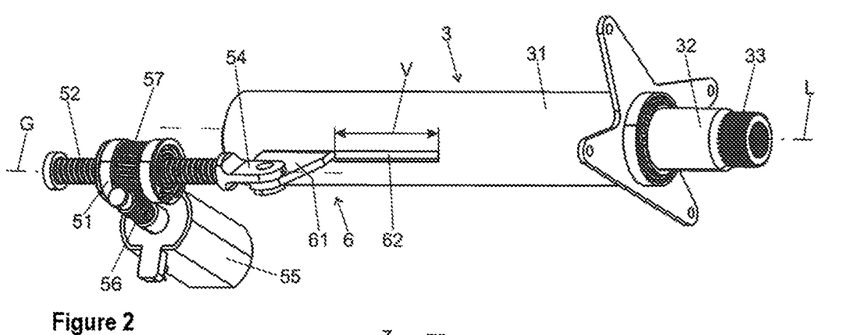
FIG. 2 is a schematic perspective partial view of the steering column according to FIG. 1.

The threaded spindle 52 is connected via the fastening element 54 to a transmission element 61, which for its part is connected to the adjusting unit 3. For this purpose, the transmission element 61 engages in the front end of a deformation slot 62 which extends rearwardly parallel to the longitudinal axis L, over the length of a displacement path V, in the outside of the casing tube 31 of the adjusting device 3. The transmission element 61 is suitable, in the interaction with the deformation slot 62, for absorbing energy in a crash situation, that is to say to convert kinetic energy, in the energy absorption device 6 during a relative movement occurring, in a crash situation, in the longitudinal direction between the adjusting unit 3 and the threaded spindle 52, into plastic deformation of the casing tube 31 in the region of the deformation slot 62, as will be explained below.

The transmission element 61 extends from the adjusting unit 3 through a slot-shaped through-opening 42 in the casing unit 4. To adjust the steering column 1, the transmission element 61 can be moved freely along in the longitudinal direction in the through-opening 42.

For motor-operated adjustment, the adjustment drive 5 has an electric actuating motor 55 by which a worm 56 can be driven to rotate, which worm engages in a toothing 57 which runs around on the outside of the spindle nut 51 coaxially to the threaded spindle axis G. By means of the thus-formed worm gear, the spindle nut 51 can be driven to rotate by the actuating motor 55 with respect to the threaded spindle axis G relative to the fixed threaded spindle 52. As a result, depending on the direction of rotation of the actuating motor 55, the threaded spindle 52 can be displaced translationally in the direction of the threaded spindle axis G relative to the spindle nut 51, and correspondingly the adjusting device 3 connected to the threaded spindle 52 is adjusted in the direction of the longitudinal axis L relative to the casing unit 4 connected to the spindle nut 51.

Figure 3:
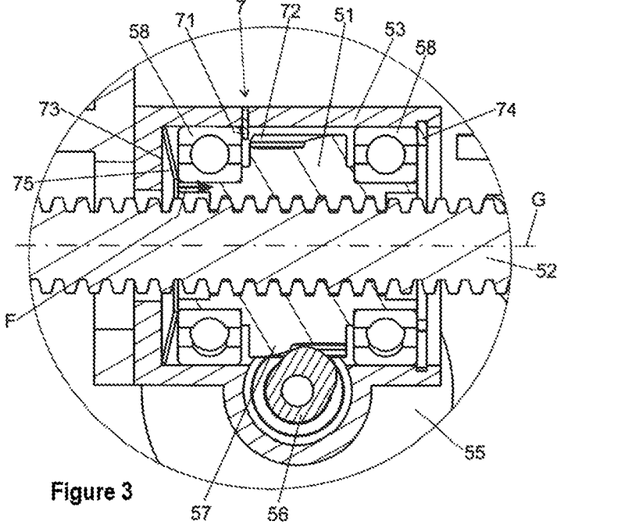
FIG. 3 is a longitudinal sectional view along the threaded spindle axis through the spindle drive of the steering column according to FIGS. 1 and 2 in the normal operating state.

FIG. 3 shows a longitudinal section along the threaded spindle axis G through the adjustment drive 5 in the region of the bearing housing 53. It can be seen therein that the spindle nut 51 is mounted rotatably in the bearing housing 53 in two radial bearings 58, which are designed as ball bearings in the example illustrated, with respect to rotation about the headed spindle axis G.

A blocking device 7 according to the invention comprises a first blocking element 71 which is fixedly arranged in the bearing housing 53, to be precise axially, opposite, in the direction of the threaded spindle axis G, to a second blocking element 72 which is formed on the spindle nut 51.

FIG. 3 illustrates the release or freeing position of the blocking device 7, which can be seen from the fact that the blocking elements 71 and 72 have an axial spacing from one another and are not in engagement with one another. Correspondingly, the spindle nut 51 is freely rotatable in the bearing housing 53 about the threaded spindle axis G and can be driven to rotate by the actuating motor 55 to adjust the steering column 1.

As explained above, the spindle nut 51 is supported in the bearing housing 53 in the direction of the threaded spindle axis G or of the longitudinal axis L substantially parallel thereto. In order to allow an activation of the blocking device 7, the spindle nut 51 can be displaced axially in the direction of the threaded spindle axis G in the bearing housing 53 between two axial counterbearings 73 and 74 which are formed by axial surfaces directed inwardly toward the spindle nut 51.

The release position illustrated in FIG. 3 is maintained in the normal operating state by virtue of the fact that a securing element designed as a spring element 75, specifically as a conical disk spring, is supported on the first counterbearing 73, on the left in the illustration, and presses the spindle nut 51 in the axial direction of the threaded spindle axis G, to the right in the drawing, against the second counterbearing 74 by the spring force F. As a result, said blocking elements 71 and 72 are kept at a distance apart. The spring force F of the spring element 75 is chosen to be high enough that, under the force which is exerted in normal operation on the adjusting unit 3 in the longitudinal direction via the steering wheel and during the adjustment of the steering column 1, and which does not exceed a predetermined threshold value, said spring element is not so compressed that the blocking elements 71 and 72 cannot come into contact. In other words, the spring element 75 secures the blocking device 7 in the release position in that it loads the blocking device 7 counter to the blocking position, which is illustrated in FIG. 4.

Figure 4:
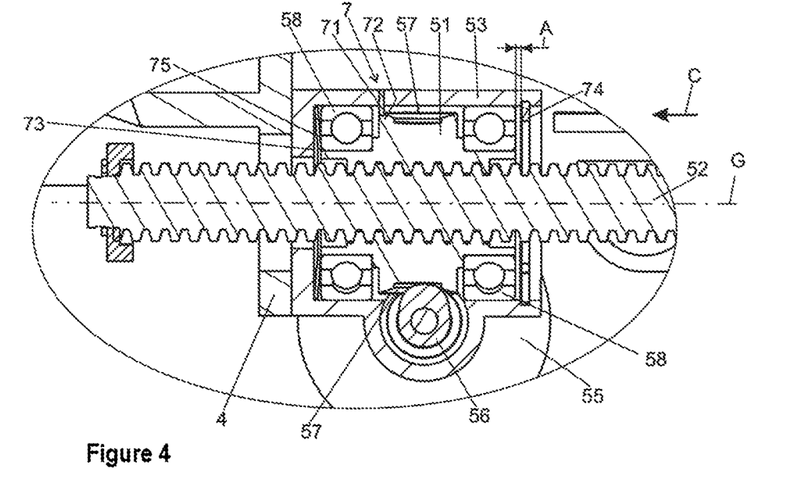
FIG. 4 is a longitudinal sectional view as in FIG. 3 during a crash situation.

FIG. 4 shows a comparable view to FIG. 3, but in the situation during a crash. In this case, a crash force C has been exerted on the threaded spindle 52 in the direction of the threaded spindle axis G, to be precise directed counter to the spring force F of the spring element 75, being directed toward the counterbearing 73; this is to the left in the drawing. As a result, the spring element 75 has been compressed and the spindle nut 51 has been moved to the left toward the counterbearing 73 by a distance A, which indicates the axial displaceability of the spindle nut 51 in the bearing housing 53. Here, the first blocking element 71 has been brought axially into engagement with the second blocking element 72. As a result, the rotation of the spindle nut 51 in the bearing housing is blocked. This is achieved for example by virtue of the fact that the first blocking element 71 forms a fixed form-fitting element which projects inwardly from the bearing housing 53, which form-fitting element engages on the spindle nut 51 in a form-fitting manner by the axial displacement into a blocking element 72 which is formed on the outside or end side and which forms a corresponding form-fitting element. For example, the blocking element 71 can be formed by a pin or cam which engages in the toothing 57 and thus immobilizes the rotation of the spindle nut 51 in the bearing housing 53.

The relative rotation of the threaded spindle 52 and spindle nut 51 is blocked according to the invention by blocking the spindle nut 51 in the bearing housing 53. The adjustment drive 5 is fixed in the instantaneous adjustment position by the crash force C acting in a crash situation. Correspondingly, even under extremely high forces C, the threaded spindle 52 can no longer slip through the spindle nut 51 in the direction of the threaded spindle axis G; the adjustment drive 5 therefore forms a rigid connection between the casing unit 4, the energy absorption device 6 and the adjusting unit 3.

Correspondingly, in a crash situation, the kinetic energy introduced is transmitted by the threaded spindle 52 to the transmission element 61. The transmission element 61 has a larger width than the deformation slot 62 into which it is inserted. As a result of the high force which acts exclusively in a crash situation in the longitudinal direction and which is greater than the threshold value of the release force of the blocking device 7 that is predetermined by the spring force F, the transmission element 61 is urged in the longitudinal direction through the deformation slot 62, which is thus widened under plastic deformation. By virtue of the invention, the full force peak occurring in a crash situation bears in any case against the energy absorption device 6, with the result that the sought as uniform as possible energy dissipation can occur over the entire displacement path V.

Figure 5:
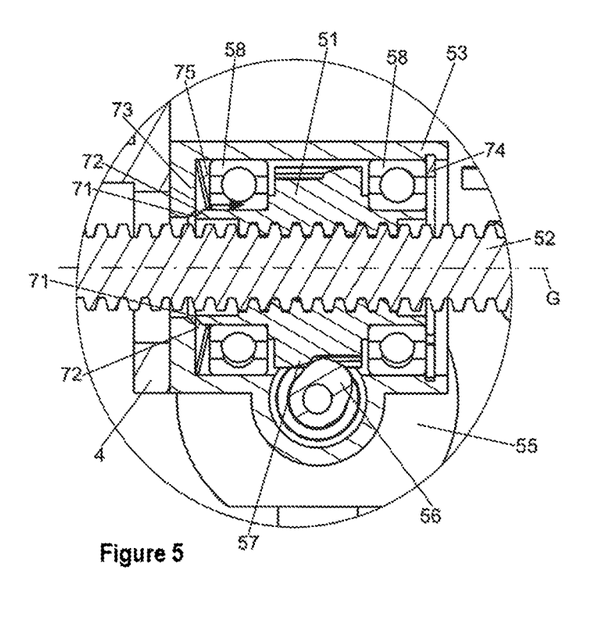
FIG. 5 is a longitudinal sectional view along the threaded spindle axis through a second embodiment of a spindle drive of the steering column according to FIGS. 1 and 2 in the normal operating state.
Figure 6:
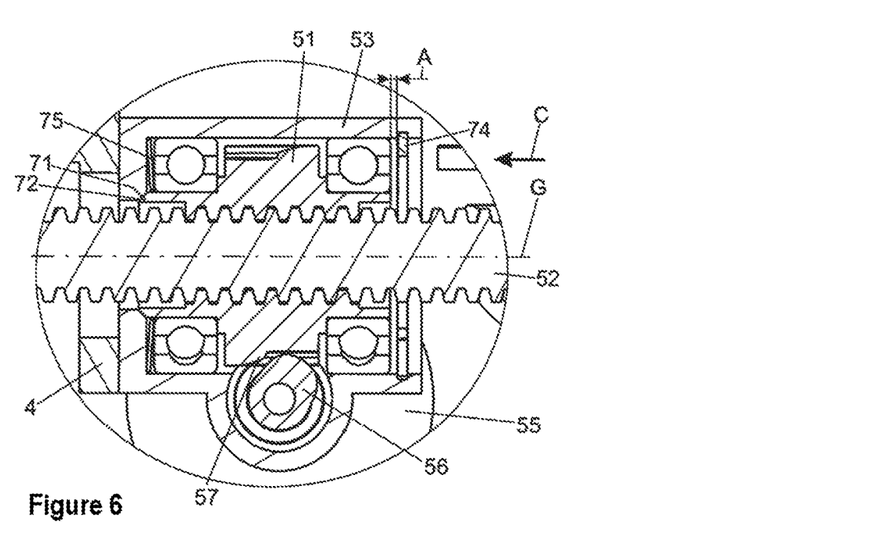
FIG. 6 is a longitudinal sectional view as in FIG. 5 during a crash situation.

FIGS. 5 and 6 show a further embodiment of the invention, in FIG. 5 in the release position, and in FIG. 6 in the blocking position. The construction and the function correspond to the embodiment illustrated in FIGS. 3 and 4, with the difference that the blocking elements 71 and 72 are arranged on end-side, conical contact surfaces, to be precise with the blocking element 71 being arranged on a concentric inner cone in the bearing housing 53, and the blocking element 72 being arranged on a conical portion, coaxial thereto, on the spindle nut 51. The blocking elements can be designed for example as force-fitting elements which have such a high coefficient of friction that blocking of the spindle nut 51 in the bearing housing 53 is ensured in a crash situation. Alternatively or additionally, there can be provided end-side, axial form-fitting elements which, in the blocking position shown in FIG. 6, are connected to one another in a form-fitting manner, for example inter-engaging toothings or the like.

Figure 7:
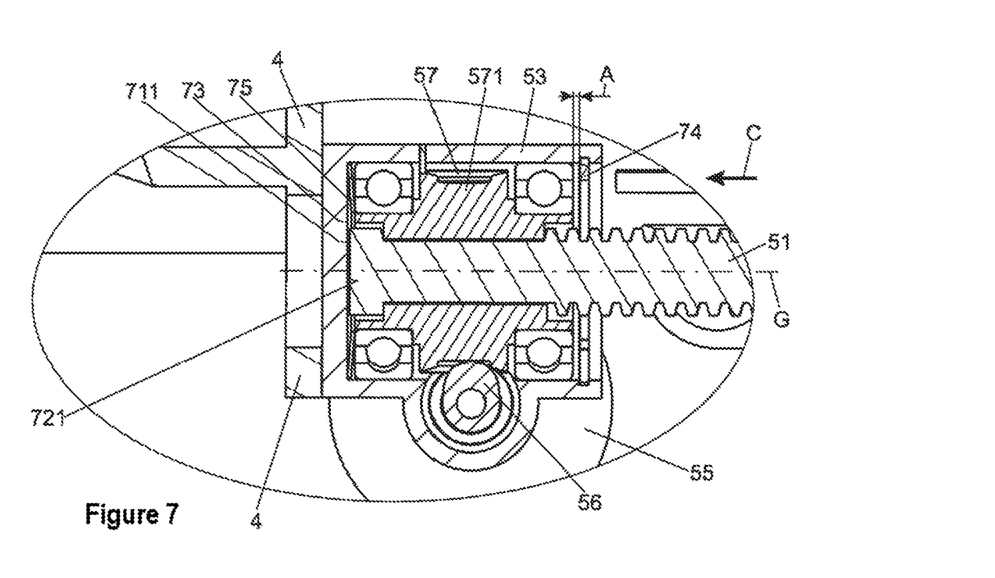
FIG. 7 is a longitudinal sectional view along the threaded spindle axis through a third embodiment of a spindle drive.

FIG. 7 shows an alternative embodiment in which, instead of the spindle nut 51, the toothing 57 is formed on a worm wheel 571 which is connected to the threaded spindle 52 in a rotationally fixed manner. Therefore, by virtue of the actuating motor 55, the threaded spindle 51 is supported on the casing unit 4 for adjustment about the threaded spindle axis G.

In the situation illustrated in FIG. 7, the effect of a crash force C has occurred, as in FIG. 4 or 6. As a result, the worm wheel 571 has been moved, together with the threaded spindle 51, in the bearing housing 53 counter to the spring force of the spring element 75 in the direction toward the counterbearing 73.

On the axial end side of the threaded spindle 51 there is arranged a blocking element 721 according to the invention which can be formed as a force-fitting and/or form-fitting element. Situated axially opposite said end side on the closed inner side of the bearing housing 53 there is arranged a blocking element 711 which is designed in a corresponding manner to the blocking element 721, for example as a force-fitting and/or form-fitting element. If, in a crash situation as illustrated, the blocking elements 711 and 721 are brought into engagement in the crash situation, the rotation of the threaded spindle 51 is blocked. The spindle nut 51 (not illustrated here) in which the threaded spindle 52 engages is fixed securely on the adjusting unit 3, with the result that, when the threaded spindle 52 is blocked in the bearing housing 53, said spindle nut is also blocked with respect to a relative rotation. It is thereby ensured, just like in the embodiments according to the preceding figures, that, in a crash situation, the spindle drive forms an unyielding, rigid force transmission element between casing tube 4, adjusting unit 3 and the energy absorption device 6. The described advantages of the invention result therefrom.

LIST OF REFERENCE SIGNS

1 Steering column
2 Supporting unit
21 Fastening means
22 Pivot bearing
3 Adjusting unit
31 Casing tube
32 Steering spindle
33 Fastening portion
4 Casing unit
41 Adjusting lever
42 Through-opening
5 Adjustment drive
51 Spindle nut
52 Threaded spindle
53 Bearing housing
54 Fastening element
55 Actuating motor
56 Worm
57 Toothing
571 Worm wheel
58 Radial bearing
6 Energy absorption device
61 Transmission element
62 Deformation slot
7 Blocking device 71, 711 Blocking element
72, 721 Blocking element
73, 74 Counterbearing
75 Spring element
L Longitudinal axis
H Height direction
G Threaded spindle axis
V Displacement path
F Spring force
C Crash force
A Distance

What is claimed is:

1. A motor-adjustable steering column for a motor vehicle, comprising:
a supporting unit configured to attach to a vehicle body;
an adjusting unit held by the supporting unit;
a steering spindle rotatably mounted about a longitudinal axis in the adjusting unit; and
an adjustment drive connected to the supporting unit and to the adjusting unit and by which the adjusting unit is adjustable relative to the supporting unit,
wherein the adjustment drive comprises:
a drive unit; and
a threaded spindle which engages in a spindle nut and which has a threaded spindle axis;
wherein the threaded spindle and the spindle nut are configured to be driven to rotate relative to one another about the threaded spindle axis by the drive unit, and
wherein the adjustment drive further comprises a blocking device which is configured to be brought into a blocking position for blocking the threaded spindle relative to the spindle nut by contacting a toothing of the spindle nut in a blocking position and thereby preventing rotation thereof.

2. The steering column of claim 1, comprising an energy absorption device disposed between the adjusting unit and the supporting unit.

3. The steering column of claim 1, wherein when in the blocking position, the blocking device comprises blocking elements which can be brought into engagement with one another.

4. The steering column claim 3, wherein blocking elements are arranged on one or more of the spindle nut, the supporting unit, the threaded spindle, or the adjusting unit.

5. The steering column of claim 3, wherein the blocking elements are one or both of form-fitting elements or force-fitting elements.

6. The steering column of claim 3, wherein to produce the blocking position, the blocking elements are configured to be brought into engagement with one another axially in the direction of the threaded spindle axis.

7. The steering column of claim 1, wherein the blocking device comprises a securing element.

8. The steering column of claim 1, wherein the spindle nut or the threaded spindle is rotatably mounted in a bearing housing connected to the supporting unit, wherein the spindle nut or the threaded spindle and the bearing housing comprise corresponding blocking elements which can be brought into engagement with one another.

9. The steering column claim 8, wherein the spindle nut or the threaded spindle is mounted in the bearing housing so as to be axially displaceable in the direction of the threaded spindle axis.

10. A motor-adjustable steering column for a motor vehicle, comprising:
a supporting unit configured to attach to a vehicle body;
an adjusting unit held by the supporting unit;
a steering spindle rotatably mounted about a longitudinal axis in the adjusting unit; and
an adjustment drive connected to the supporting unit and to the adjusting unit and by which the adjusting unit is adjustable relative to the supporting unit,
wherein the adjustment drive comprises:
a drive unit;
a bearing housing comprising an inner side;
a threaded spindle which has a threaded spindle axis and a blocking element on an end thereof positioned within the bearing housing and facing the inner side thereof; and
a worm wheel fixed about the threaded spindle inside of the bearing housing, the worm wheel configured to be rotated by the drive unit;
wherein the threaded spindle is driven to rotate by action of the drive unit on the worm wheel, and
wherein the blocking element of the threaded spindle is configured to be brought axially into a blocking position in contact with the inner side of the bearing housing to block rotation of the threaded spindle.

* * * * *